United States Patent [19]

McConnell et al.

[11] 3,741,405

[45] June 26, 1973

[54] LOAD LOCK
[75] Inventors: Kennedy McConnell, Riverdale; Raymond F. Juechter, Glenwood, both of Ill.
[73] Assignee: Interlake, Inc., Chicago, Ill.
[22] Filed: July 20, 1971
[21] Appl. No.: 164,343

[52] U.S. Cl...................... 211/177, 287/189.36 R
[51] Int. Cl...................... A47f 5/10, F16b 17/00
[58] Field of Search..................... 211/177, 176, 182, 211/183; 287/54 C, 189.36 R, 389.36 C, 189.35; 292/147, 152; 151/41.75, 69; 85/8.8; 52/720, 721

[56] References Cited
UNITED STATES PATENTS

| | | | |
|---|---|---|---|
| 2,246,457 | 6/1941 | Schultz | 85/1 H UX |
| 2,280,084 | 4/1942 | Segal | 292/152 |
| 3,070,237 | 12/1962 | Fullerton et al. | 211/176 |
| 3,164,054 | 1/1965 | Biesecker | 85/8.8 |
| 3,351,212 | 11/1967 | McConnell | 211/177 |

FOREIGN PATENTS OR APPLICATIONS

| | | | |
|---|---|---|---|
| 917,384 | 9/1946 | France | 151/41.75 |
| 810,117 | 8/1951 | Germany | 292/147 |
| 938,492 | 10/1963 | Great Britain | 151/41.75 |
| 240,745 | 4/1946 | Switzerland | 292/152 |

*Primary Examiner*—Ramon S. Britts
*Attorney*—Curtis F. Prangley, David A. Vogel and J. Terry Stratman et al.

[57] ABSTRACT

The load lock of the present invention is to lock the beam of a pallet rack structure to an upright of an end frame and includes an L-shaped bolt having a shank slidably extending through aligned holes in the upright and an end plate of the beam and having a headed handle portion extending through a contoured slot in the beam wall adjacent the end of the beam. The handle portion is encircled by a generally cylindrical spring metal retainer having a pair of extensions embracing the bolt between the shank and the handle portion, having diametrically opposed projecting tabs engaging the inner face of the beam wall adjacent the slot and with cooperation of the head to prevent removal of the load lock, and having projections engageable with the edges of the contoured slot to hold the load lock in any adjusted position of the shank with respect to the hole through which it extends in the beam end plate. The load lock is so constructed than when properly inserted in a contoured slot with its shank projecting into the beam end plate opening it cannot be removed. A modified form of beam slot is made long enough to permit removal of the shank from the beam end plate hole and the removal of the load lock from the slot; a load lock movement limiting device is provided to prevent this from being done unintentionally.

27 Claims, 12 Drawing Figures

PATENTED JUN 26 1973 3,741,405

INVENTORS
KENNEDY McCONNELL
RAYMOND F. JUECHTER
BY Pringley, Clayton, Mullin,
Dithmar & Vogel
ATTYS.

3,741,405

LOAD LOCK

The present invention relates to load locks for use in locking the beams to the vertical frames of pallet racks. A typical pallet rack is disclosed in George E. Rasmussen U.S. Pat. No. 3,042,221 dated July 3, 1962. As disclosed in this patent, a pallet rack comprises at least a pair of end frames having vertical uprights connected together by horizontal and diagonal cross bracing. The end frames are interconnected by beams which have lug and slanted key slot connections with the uprights. Locking of the beam to the upright is provided by a sliding bolt which has a shank extending through aligned holes in the upright beam end plate and a Z-shaped bracket welded to the inner face of the end plate. The bolt is L-shaped and has a handle projecting through an L-shaped slot in a wall of the beam adjacent the end plate. The arrangement is such that the bolt cannot be removed from the aligned holes in the end plate and bracket and the L-shaped slot in the beam.

The load lock of the present invention contemplates use of a locking bolt which is assembled to the beam after the beam end plate has been welded in place. In using the load lock of the present invention, the load lock is mounted after the beam has been completed, and the size and length of the beam has no affect on mounting the load lock thereto.

The load lock is an L-shaped bolt having a locking shank and a handle. The handle has a head and is fitted with a spring metal retainer therebelow which keeps the bolt secured to the beam and retained vertically and also holds it in an adjusted position in a contoured slot in the beam so that the shank is either in load locking or unlocked positions.

It is therefore a principal object of the present invention to provide a new and improved load lock for use in pallet rack beams which lock is positive in its operation, is easily installed in a completed rack beam, and cannot be unintentionally or accidentally removed.

Another object is to provide a new and improved load lock having a novel spring metal retainer around the handle portion of the lock to prevent its removal from the rack beam and to hold it in an adjusted position in a contoured slot in the beam wall.

Yet another object is to provide a new and improved load lock which is mounted on the front of the beam so that the user can visually confirm the position of the load lock.

Other objects and advantages will become apparent from the following description taken in conjunction with the accompanying drawings and appended claims.

Figure 1:
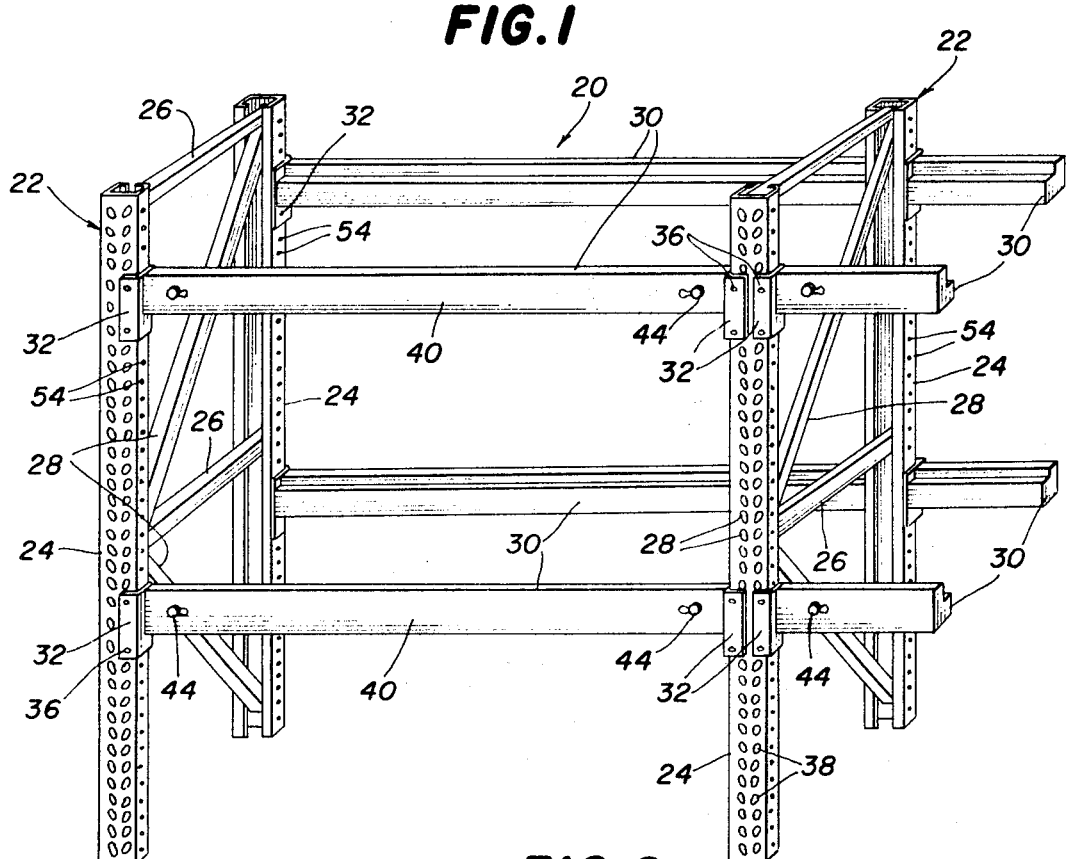
FIG. 1 is a perspective view of a pallet rack structure utilizing the load lock of the present invention.

FIG. 1 of the drawings illustrates a pallet rack 20 having end frames 22, each of which is formed of a pair of uprights 24 interconnected by horizontal braces 26 and diagonal braces 28, the braces being welded to the uprights 24.

The frames 22 are interconnected by pallet supporting tubular beams 30, which may be made of a pair of channel shaped bars welded together. Each beam 30 has angle shaped end plates 32 welded to the opposite open ends thereof. Flange 34 of the angle 32 is fitted with a pair of headed lugs 36 which engage in slanted key hole shaped slots 38 in the upright 24 by means of which the end of the beam 30 is removably secured to the respctive upright 24. The arrangement is such that the angled end plate 32 contacts the frame upright 24 along two faces to provide initial assurance that the beam 30 will not twist or rotate relative to the frame 22 and that when pallets are supported on the rack 20 by bridging across between the beams 30, the pallets and the loads carried thereby will be safely stored.

Figure 2:
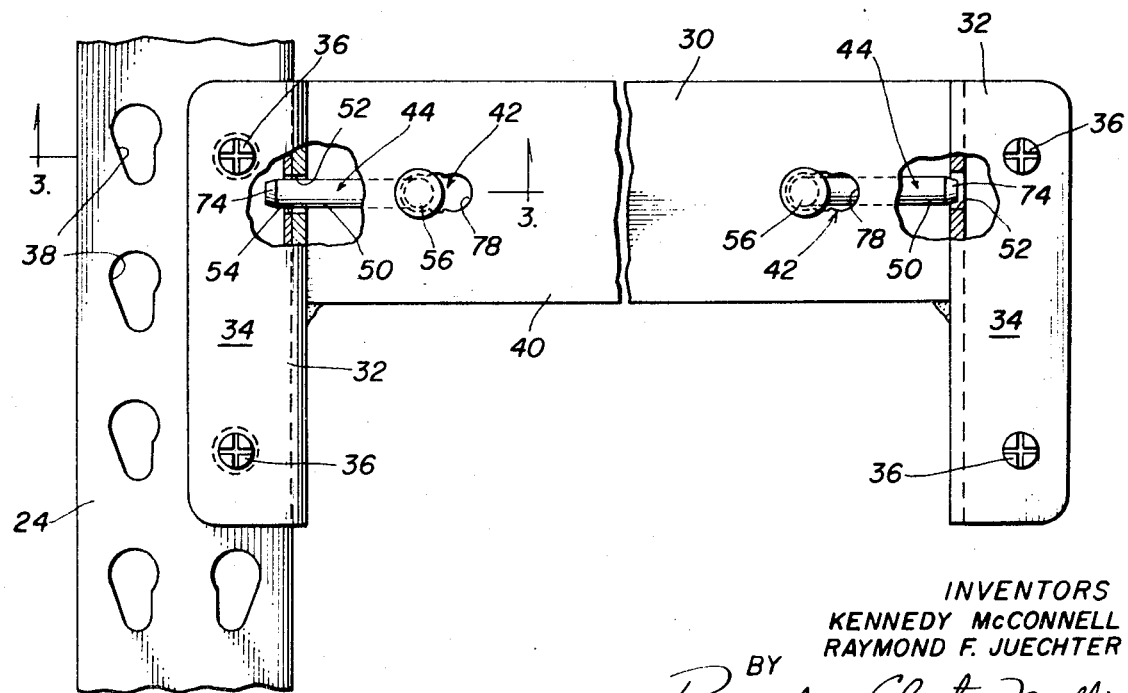
FIG. 2 is an elevational view, partially broken away, showing a beam mounted on a frame upright and one load lock in locking position and another in withdrawn position.
Figure 3:
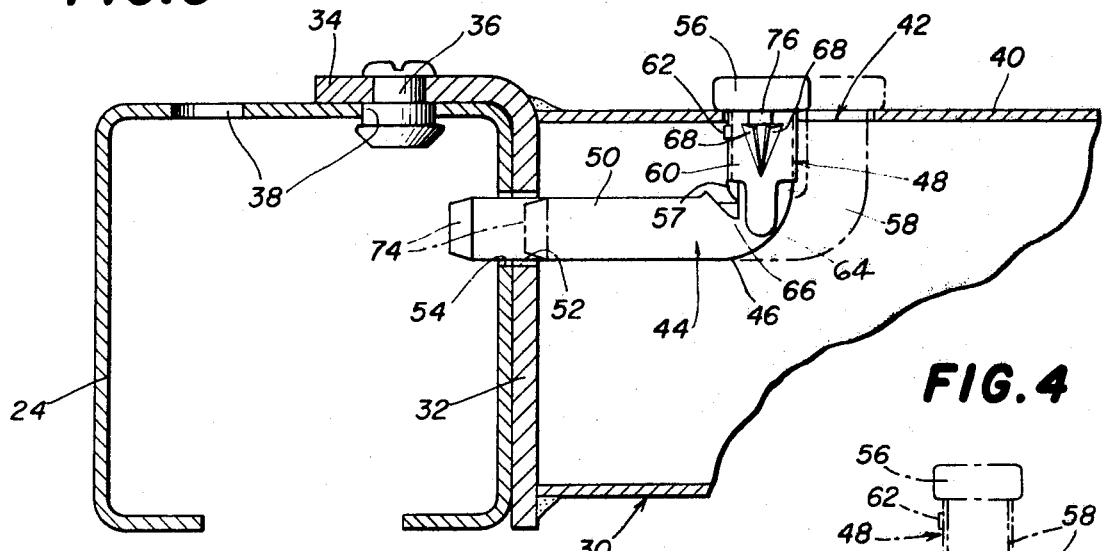
FIG. 3 is a fragmentary horizontal sectional view on an enlarged scale taken along the line 3—3 of FIG. 2, looking in the direction of the arrows.

As seen in FIGS. 1, 2, and 3, the beam 30 has an outer wall 40 which forms the base of one of the channels of which the beam is made. Adjacent each beam end a contoured slot 42 is formed in the front wall, the slot shape being most clearly shown in FIG. 7. The slot 42 receives and limits the movement of a load lock 44.

The load lock 44 base is an L-shaped bolt 46 which carries a retainer 48 made of spring metal on that portion thereof which projects through the contoured slot 42.

The bolt 46 has a shank 50 which slidably projects through a hole 52 in the end plate 32 and an aligned hole 54 in the vertical upright 24. When the shank 50 is in the full line position, shown in FIGS. 2 and 3 and extends through both of the holes 52 and 54, it is not possible to move the beam 30 with respect to the upright 24 in a direction as to disengage the lugs 36 from the key hole slots 38 nor to twist or rotate the beam relative to the upright. The load lock 44 in locking position therefore insures that the beam 30 remains fixed to the upright and that the load carried on the beam is properly transmitted to the frame member 22.

Figure 6:
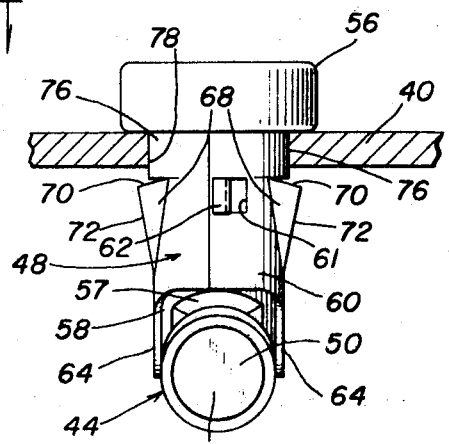
FIG. 6 is an elevational view on the scale of FIG. 5 and taken from the left side thereof showing the handle and the retainer in the beam wall slot.

The bolt 46 has a head 56 at the outer end of a handle portion 58 of the bolt 46 and load lock 44 and has its underside slidable along the outer face of the beam wall 40 adjacent the contoured slot 42. The retainer 48 encircles or encloses the greater part of the handle portion 58 by a generally cylindrical body 60, FIG. 7. As seen also in FIG. 6, the cylindrical body 60 is formed of a generally rectangular piece of metal shaped into cylindrical form and having an opening 61 adjacent to one longitudinal edge thereof and a tab 62 extending from the other longitudinal edge thereof and extending through the opening 61 and back upon itself firmly to lock the cylindrical body 60 about the handle portion 58.

Figure 4:
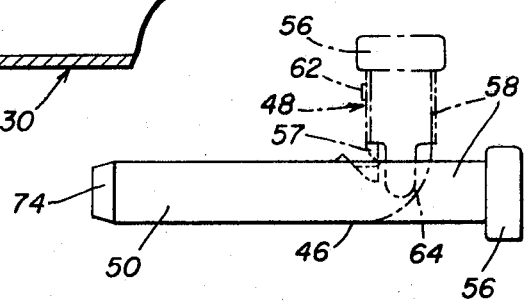
FIG. 4 is a view showing the load lock pin prior to bending and illustrating the position of the retainer after bending.

It is essential that the retainer 48 be mounted on the bolt 46 in a position that resists appreciable turning thereof on the handle portion 58. To effect this result the body 60 of the retainer is formed with a pair of diametrically opposed extensions 64 which embrace bend 66 in the bolt 46 between the shank 50 and the handle portion 58. As seen in FIG. 4 the bolt 46 initially is straight and the retainer is slipped thereover so that its end opposite the extensions 64 rests against the underside of the head 56. The bolt is bent to form the right angle bend 66 so that the handle portion 58 is normal to the shank 50 as seen by comparing the full line and dot-dash line shapes of FIG. 4. During this time the extensions 64 lie along the outside of the bend 66 and effectively prevent rotation of the retainer 48 after the bend has been made.

The retainer 48 is also restrained against longitudinal movement with respect to the handle portion 58, such restraint being provided at one end by the head 56 and at the other end by a projection 57 formed during the right angle bending of the bolt 46 from the straight condition thereof to the right angle condition thereof as illustrated in FIG. 4. The projection 57 cooperates with the head 56 positively to position the retainer 48 on the handle portion 58 during all uses of the load lock 44.

The retainer 48 has the dual function of assisting in holding the load lock 44 in the contoured slot 42 in the beam wall 40 and also in adjusted longitudinal position of the shank 50. For the first function the body 60 of the retainer is formed with two pairs of diametrically opposed triangular tabs 68 which are struck out during the forming process and prior to mounting the retainer 48 on the load lock. The tabs 68 have edges or faces 70 which are adapted to engage the inner face of the beam wall 40 adjacent the edges of the contoured slot 42. These tab faces 70 cooperate with the head 56 in preventing any significant longitudinal and vertical movement of the handle portion 58 within the slot 42.

The tabs 68 are formed with converging edges 72 which extend from the tips of the faces 70 to a point in the body 60. The purpose of these edges is to permit temporary collapse of the tabs 68 during the insertion of the load lock 44 through the slot 42. The load lock 44 should be inserted into the beam 30 prior to mounting the beam on the end frame uprights 24. The shank 50 of the bolt is inserted through the contoured slot 42 and its tapered end 74 fed through the hole 52 in the end plate 32. This will bring the tips of the converging edges 72 against the edges of the slot 42. In this position the bolt is driven inwardly either by striking its head 56 with a tool or with the heel of the hand so that the inner or under face of the head 56 contacts the wall 40 at which time the tab faces 70 will have cleared the edges of the slot 42 and engaged the inner face of the beam wall 40, thus effectively locking the bolt 44 in the beam. In this embodiment of the invention the faces 70 prevent extricating the load lock 44 from the slot 42 in the manner in which it was inserted, and consequently it remains secured in place and cannot be unintentionally or accidentally lost from the beam 30.

Figure 5:
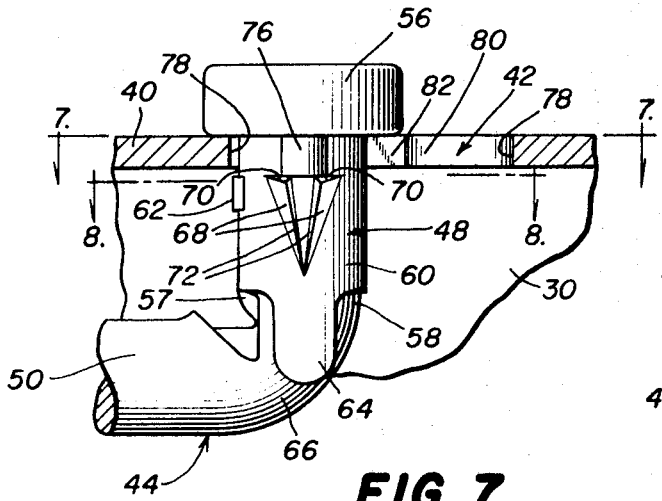
FIG. 5 is a fragmentary detail view on a further enlarged scale of the handle and retainer portion of the load lock in a slot in the beam wall.
Figure 7:
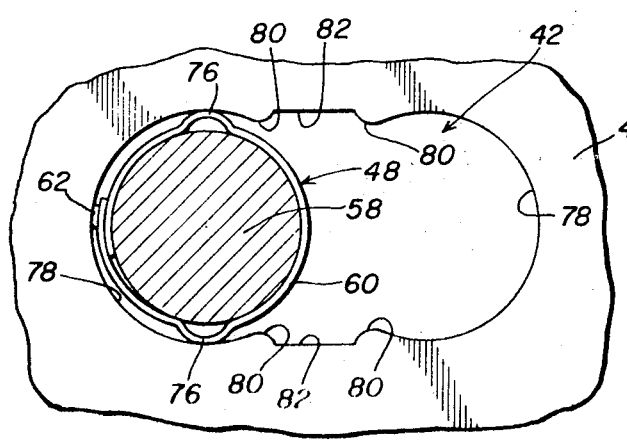
FIG. 7 is a sectional view on an enlarged scale taken along the line 7—7 of FIG. 5, looking in the direction of the arrows.
Figure 8:
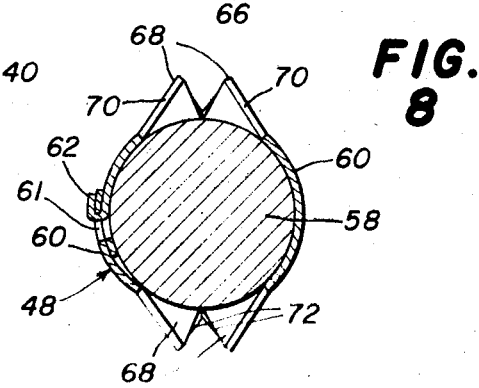
FIG. 8 is a sectional view taken along the line 8—8 of FIG. 5, looking in the direction of the arrows.

As seen by a comparison of the two different positions of the load lock 44 in FIG. 2 and the solid and dot-dash line positions in FIG. 3, the load lock 44 is intended to be moved lengthwise of the contoured slot 42 and to be retained in the positions selected by the assembler of the pallet rack 20. Referring primarily to FIGS. 2, 5 and 7, the retainer 48 is shown to be formed with a pair of diametrically opposed projections 76 which engage the edges of the slot 42 adjacent the tab faces 70 and immediately below the head 56 to hold the load lock 44 in the selected position.

The slot 42 as seen most clearly in FIG. 7 includes a pair of generally cylindrical ends 78 surrounded by inwardly facing rounded arcs 80 and an interconnecting straight edge 82. At its extreme positions the load lock 44 is engaged in one or the other of the cylindrical ends 78. In these positions, one of which is shown in FIG. 7, the projections 76 on the retainer 48 engage the cylindrical edge 78 and are normally prevented from moving toward the center of the slot by the inwardly projecting edge arcs 80. As a matter of fact, FIG. 7 shows that the general cylindrical retainer 48 and the partly circular edge 78 have a common center which permits the projections 76 on the retainer body 60 to be at maximum expansion which is the norml position. Should it be desired to move the load lock 44 to the opposite end of the slot 70, the head 50 is grasped and slid along the surface of the outer wall 40. This movement engages the retainer projections 76 on the retainer 48 with the slot edge arcs 80 and compresses the projections 76 by the resiliency of the spring metal of which the retainer is made. This movement is permitted by a compression of the projections 76. The projections 76 next appear opposite the straight edges 82 but these edges are sufficiently close to each other that the tab faces 70 prevent withdrawal of the bolt 46, and the sliding movement if continued until the projections 76 contact and are compressed by the other set of inward arcs or projections 80 at which time the unit passes into the other partly circular portion 78 of the slot 42. If FIGS. 3 and 7 be correlated to illustrate the foregoing, the full line position would indicate the locked position. The dot-dash line of FIG. 3 indicates the load lock in unlocked position which it occupies by moving it to the other end of the slot 42 (FIG. 7). In the unlocked position the beam 30 can be removed from the upright 24.

The disclosure shows that the load lock 44 is amply supported in the beam by having its handle portion secured in the contoured slot 42 between the tab faces 70 and the underside of the head 56. Rotation of the load lock 44 about the handle portion 58 is prevented because at all positions of the load lock 44 at least the tip 74 of the shank lies in the opening 52 in the beam end plate 32. In locking position the shank 50 projects through the aligned holes 52 and 54 in the beam end plate 32 and the upright 24. It is impossible for reasons which have previously been set forth in detail to remove this load lock from the contoured slot 42, and the assembly remains intact. It further will be appreciated that the load lock 44 is disposed on the outwardly disposed or front wall 40 of each of the beams 30, and as a consequence, a user can visually ascertain whether the load lock 44 is in the locked or unlocked position thereof, thereby facilitating ready inspection and confirmation that the load lock 44 is in the desired position thereof.

A modified form of assembly is shown in FIGS. 9 through 12. In this form the load lock 44 is constructed in precisely the same manner as was described with respect to FIGS. 1 through 8 and is inserted in the manner previously described. It may, however, be removed without damage.

Figure 9:
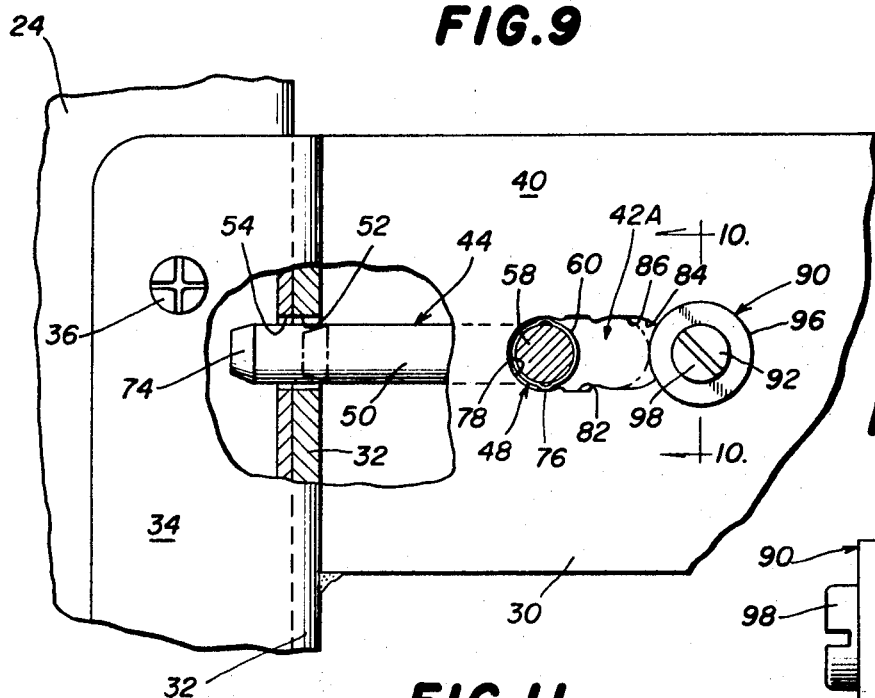
FIG. 9 is a fragmentary elevational view, partially broken into section showing a modified form of slot from which the load lock may be removed.
Figure 11:
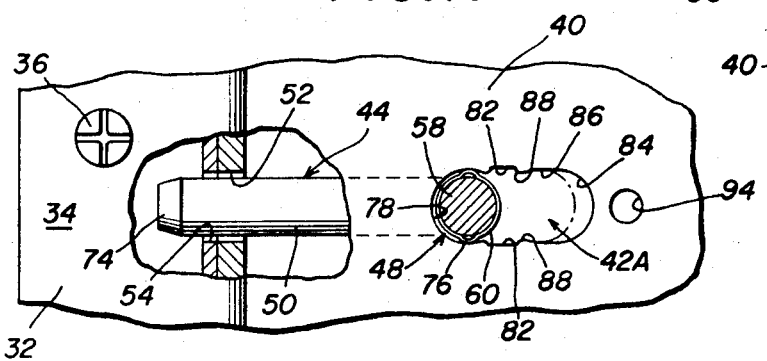
FIG. 11 is a view similar to FIG. 9 showing the movement limiting device removed.
Figure 12:
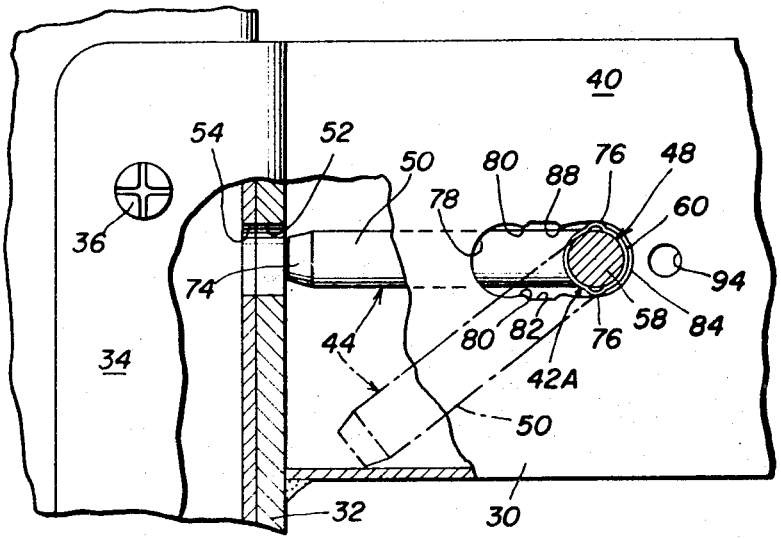
FIG. 12 is a view similar to FIG. 10 showing the load lock in withdrawn and in turned positions prior to removal from the slot.

In the modified assembly a contoured slot 42A is provided in the beam 30, and its left end (closest to the beam plate 32) is precisely the same as the slot 42 shown in FIG. 7. The right or remote end, however, has a semicircular portion 84 interconnected with a short straight portion 86 and joining a pair of inward projections or arcs 88 like the projections 80 and having the same functions. In FIGS. 9 and 11 the dot-dash line at the right end of the slot 42A shows the normal desirable limitations on the movement of the handle 58 of the load lock 44, but under certain circumstances where it may be desired to remove the load lock 44 from the beam 40, due perhaps to prior damage to the shank 50, the shank should be removed completely from the hole 52 in the beam end plate 32. Under these conditions the load lock 44 would be moved to the full line position shown in FIG. 12 where it is seen that even the tapered end 74 is clear of the beam end plate hole 52 and the load lock 44 may be turned within the cylindrical circular portion 84 of the slot 42A. The projections 76 do not function to inhibit significantly the passage of the retainer 48 past the inward projections 88 and they may be moved into the opposite straight sections 82 of the slot. At this point the tab faces 70 will no longer engage the inner face of the beam wall 40 and the retainer 48 can be slipped from the slot 42A and the load lock 44 manipulated in such fashion as to be removed from the contoured slot 42A.

Figure 10:
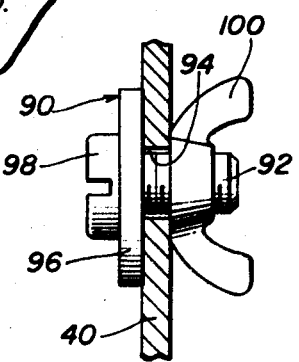
FIG. 10 is an enlarged transverse sectional view of device for limiting the load lock movement in the slot and is taken along the line 10—10 of FIG. 9 looking in the direction of the arrows.

Under normal use of the structure, however, this extreme movement of the load lock 44 is not desirable, and a motion limiting assembly, seen most clearly in FIGS. 9 and 10, is provided. This assembly comprises a bolt 92 extending through a hole 94 in the outer wall 40 inwardly of the end of the contoured slot 42A. The bolt 92 is provided with a washer 96 which may be welded or brazed onto or formed integrally with bolt head 98. The washer 96 is sufficiently large so that it overlies a portion of the inner end of the circular end 84 of the slot 42A and limits the normal withdrawal movement of the load lock 44 to the same extent as that permitted by the slot 42 illustrated in FIGS. 1 through 8.

The assembly is retained in place by a wing nut 100 threaded onto the shank of the bolt 92. When it is desired to remove the load lock 44 from the slot 42A the motion of the wing nut 100 is arrested by a finger inserted through the slot 42A while unscrewing the bolt 92. This frees the structure of the movement limiting device, FIGS. 11 and 12, and the movement of the load lock 44 is such that it goes to the extreme right or inner end of the slot 42A and can be removed in the manner previously described.

A simpler version of this arrangement would be to weld or braze a nut to the inner face of the beam wall 40 at the hole 94 so that the bolt 92 could be screwed directly thereinto without having one manually hold the wing nut 100 in place. This would also prevent inadvertently dropping the wing nut inside the beam as might happen in view of the relatively small space which is afforded by the maximum cross dimension of the slot 42A.

From the foregoing description it is clear that the advantages and objectives of the present invention which were set forth at the outset of this specification have been attained by the structure described and shown.

What is claimed as new and desired to be secured by United States Letters Patent is:

1. A load lock for use in a pallet rack for locking a beam end to an upright in a frame, comprising in combination an L-shaped bolt and a beam, said bolt having a shank aligned with and slidable through a hole in the end of the beam and adapted to slide through an aligned hole in the frame upright, a handle portion integral with said shank at right angles thereto and having an enlarged head on the free end thereof and extending through a contoured movement-limiting slot in a wall of the beam, said head engaging an exterior surface of said beam adjacent to said slot, a retainer including a generally cylindrical body encircling said handle portion to restrict the latter for sliding movement in said slot, resilient means on said cylindrical body slidably engaging the edge surfaces of said slot to retain said bolt in an adjusted position, and means on said handle portion positively positioning and holding said retainer on said handle portion between said head and said positioning means.

2. The combination set forth in claim 1, wherein said positioning means is disposed adjacent to the juncture between said handle portion and said shank.

3. The combination set forth in claim 1, including means on said cylindrical body embracing the bend in said bolt between said shank and said handle portion to resist turning movement of said body on said handle portion.

4. The combination set forth in claim 1, wherein said retainer includes pairs of diametrically opposite tabs projecting outwardly from said body and engageable with the inner surface of the beam wall adjacent said contoured slot.

5. The combination set forth in claim 4, wherein said tabs project outwardly from said body and face in spaced relationship the underside of said handle portion head so as to accommodate therebetween the beam wall adjacent said contoured slot.

6. The combination set forth in claim 1, wherein said resilient means comprises a pair of diametrically opposite projections outstanding from said body and engageable with the edge surfaces of said contoured slot to retain said bolt shank in longitudinally adjusted position.

7. The combination set forth in claim 6, wherein said contoured slot edge surfaces have a pair of partly circular ends interconnected by a straight section, and have inward projections at the termini of said straight section to retain said handle portion within the confines of either of said circular ends.

8. The combination set forth in claim 1, wherein said retainer includes pairs of diametrically opposite tabs projecting outwardly from said body and engageable with the inner surface of the beam wall adjacent said contoured slot, and said resilient means comprises a pair of diametrically opposite projections outstanding from said body between said tabs and the underside of said head and engageable with the edge surfaces of said contoured slot to retain said bolt shank in longitudinally adjusted position.

9. The combination set forth in claim 1, wherein said contoured slot edge surfaces have a pair of partly circular ends, that end nearest the beam end being bounded by a pair of inward projections, the other end being connected to a pair of straight surface portions spaced apart the diameter of said other end, said straight portions having their termini remote from said other end connected to a second pair of inward projections, and straight sections interconnecting said pairs of inward projections, the distance between said partly circular ends being such that when said handle portion is in said other circular end said shank is withdrawn from the hole in the beam end and said bolt may be rotated to remove said restricting means from engagement with the inner surface of the beam wall so that the load lock may be removed from the beam.

10. The combination set forth in claim 9, including removable means for limiting movement of said handle portion into said other circular end so as to retain said shank in the hole in the beam end.

11. The combination set forth in claim 10, wherein said removable means comprises a stop member overlying a portion of said other circular end and a bolt to hold said stop member in movement limiting position so that said shank may not be slid from the hole in the beam end.

12. A beam for use in a supporting structure comprising in combination, an elongated tubuler body portion secured at one end to an end flange, a hole in said end flange opening into the interior of said body portion, a load lock having an L-shaped bolt with a shank aligned with and slidable through said end flange hole, a contoured movement limiting slot in an exterior wall of said body portion, a handle portion integral with said shank at right angles thereto and having an enlarged head on the free end thereof and extending through said contoured slot, said head engaging an exterior surface of said beam adjacent to said slot, means on said handle portion to restrict the latter for sliding movement in said contoured slot, and resilient means on said handle portion slidably engaging the edge surfaces of said contoured slot to retain said shank in an adjusted position in said end flange hole.

13. The combination set forth in claim 12, wherein said restricting means and said resilient means are incorporated in one unit having a generally cylindrical body encircling said handle portion.

14. The combination set forth in claim 13, including means on said cylindrical body embracing the bend in said bolt between said shank and said handle portion to resist turning movement of said body on said handle portion.

15. The combination set forth in claim 13, wherein said restricting means comprises pairs of diametrically opposite tabs projecting outwardly from said body and engageable with the inner surface of said beam body portion wall adjacent said contoured slot.

16. The combination set forth in claim 15, wherein said tabs project outwardly from said body and face in spaced relationship the underside of said handle portion head so as to accommodate therebetween said beam wall adjacent said contoured slot.

17. The combination set forth in claim 13, wherein said resilient means comprise a pair of diametrically opposite projections outstanding from said body and engageable with said edge surfaces of said contoured slot to retain said bolt shank in longitudinally adjusted position within said end flange hole.

18. The combination set forth in claim 17, wherein said contoured slot edge surfaces have a pair of partly circular ends interconnected by a straingt section, and have inward projections at the termini of said straight section to retain said handle portion within the confines of either of said circular ends.

19. The combination set forth in claim 13, wherein said restricting means comprises pairs of diametrically opposite tabs projecting outwardly from said body and engageable with the inner surface of said body portion wall adjacent said contoured slot, and said resilient means comprises a pair of diametrically opposite projections outstanding from said body between said tabs and the underside of said handle portion head and engageable with said edge surfaces of said contoured slot to retain said bolt shank in longitudinally adjusted position within said end flange hole.

20. A supporting structure comprising in combination, at least a pair of end frames each having two uprights, tubular beams interconnecting said end frames, each upright having a plurality of slanted keyhole slots along an outward face thereof, each beam having its open end closed by an angle plate adapted to embrace the upright, one flange of said plate carrying headed lugs engageable in said slanted keyhole slots to support the beam, said uprights having a plurality of vertically spaced holes along the face thereof directed toward said beam, the other flange of said plate on said beam having a hole therein alignable with one of the holes in said upright when said beam is supported thereby, a load lock for preventing removal of said beam from said upright having an L-shaped bolt with a shank aligned with and slidable through the aligned holes in said upright and said beam plate, a handle portion integral with said shank at right angles thereto and having an enlarged head on the free end thereof and extending through a contoured movement-limiting slot in an exterior wall of said beam, said head engaging an exterior surface of said beam adjacent to said slot, means on said handle portion to restrict the latter for sliding movement in said slot, and resilient means on said handle portion slidably engaging the edge surfaces of said contoured slot to retain said bolt in adjusted position.

21. The combination set forth in claim 20, wherein said restricting means and said resilient means are incorporated in one unit having a generally cylindrical body encircling said handle portion.

22. The combination set forth in claim 21, including means on said cylindrical body embracing the bend in said bolt between said shank and said handle portion to resist turning movement of said body on said handle portion.

23. The combination set forth in claim 21, wherein said restricting means comprises pairs of diametrically opposite tabs projecting outwardly from said body and engageable with the inner surface of said beam wall adjacent said contoured slot.

24. The combination set forth in claim 23, wherein said tabs project outwardly from said body and face in spaced relationship the underside of said handle portion head so as to accommodate therebetween said beam wall adjacent said contoured slot.

25. The combination set forth in claim 21, wherein said resilient means comprises a pair of diametrically opposite projections outstanding from said body and engageable with said edge surfaces of said contoured slot to retain said bolt shank in longitudinally adjusted position.

26. The combination set forth in claim 25, wherein said contoured slot edge surfaces have a pair of partly circular ends interconnected by a straight section, and have inward projections at the termini of said straight section to retain said handle portion within the confines of either of said circular ends.

27. The combination set forth in claim 21, wherein said restricting means comprises pairs of diametrically opposite tabs projecting outwardly from said body and engageable with the inner surface of said beam wall adjacent said contoured slot, and said resilient means comprises a pair of diametrically opposite projections outstanding from said body between said tabs and the underside of said head and engageable with said edge surfaces of said contoured slot to retain said bolt shank in longitudinally adjusted position.

* * * * *